(12) United States Patent
Prud'Homme et al.

(10) Patent No.: US 7,001,940 B2
(45) Date of Patent: Feb. 21, 2006

(54) USE OF SUBSTITUTED BIAROMATIC β-DIKETONE AS STABILIZING AGENT OF HALOGENATED POLYMERS AND RESULTING POLYMER

(75) Inventors: Christian Prud'Homme, Lyons (FR); Michel Dury, Lyons (FR)

(73) Assignee: Rhodia Chimie, Boulogne Billancourt (FR)

(*) Notice: Subject to any disclaimer, the term of this patent is extended or adjusted under 35 U.S.C. 154(b) by 0 days.

(21) Appl. No.: 10/472,749

(22) PCT Filed: Mar. 26, 2002

(86) PCT No.: PCT/FR02/01043

§ 371 (c)(1),
(2), (4) Date: Sep. 24, 2003

(87) PCT Pub. No.: WO02/077091

PCT Pub. Date: Oct. 3, 2002

(65) Prior Publication Data

US 2004/0097626 A1    May 20, 2004

(30) Foreign Application Priority Data

Mar. 26, 2001 (FR) .................................. 01 04012

(51) Int. Cl.
C08K 5/07    (2006.01)

(52) U.S. Cl. ........................................................ 524/357
(58) Field of Classification Search .................. 524/357
See application file for complete search history.

(56) References Cited

U.S. PATENT DOCUMENTS

| 4,221,687 A | | 9/1980 | Minagawa | 524/114 |
| 5,102,933 A | * | 4/1992 | Bae et al. | 524/147 |
| 5,147,917 A | * | 9/1992 | Sugawara et al. | 524/357 |
| 5,244,949 A | * | 9/1993 | Wirth et al. | 524/100 |
| 5,283,273 A | | 2/1994 | Sander | 524/102 |

FOREIGN PATENT DOCUMENTS

EP    0 446 685    9/1991

OTHER PUBLICATIONS

International Search Report.

* cited by examiner

*Primary Examiner*—Peter Szekely

(57) ABSTRACT

The present invention relates to the use of a stabilising composition free of derivatives of 6-aminouracyl or 6-aminothiouracyl type, and comprising at least one β-diketone bearing two aromatic nuclei, at least one of which bears at least one substituent on one of the two orthopositions or on the paraposition; the said substituent being chosen from —R, —OR, —SR, —COOH, —O—$CF_3$ and —S—$CF_3$ radicals, in which formulae R is an alkyl radical. The invention also relates to halogenated polymers comprising such a stabilising composition.

4 Claims, No Drawings

US 7,001,940 B2

USE OF SUBSTITUTED BIAROMATIC β-DIKETONE AS STABILIZING AGENT OF HALOGENATED POLYMERS AND RESULTING POLYMER

This application is an application under 35 U.S.C. Section 371 of International Application No. PCT/PCT/02/01043 filed on Mar. 26, 2002.

The present invention relates to the use of a stabilising composition free of a derivative of 6-aminouracyl or 6-aminothiouracyl type, and comprising at least one β-diketone bearing two aromatic nuclei, at least one of which is substituted, and also to halogenated polymers comprising such a stabilising composition.

A marked change in the choice and nature of the additives used for stabilising halogenated polymers, such as polyvinyl chloride and the like, has been noted in recent years. Thus, lead-based stabilisers have for some time already not been permitted for use as halogenated-polymer stabilisers on account of their toxicity. Tin-based stabilisers will also soon be removed from stabilising formulations, and it may be envisaged that there is the intention, in the not too distant future, to replace most, if not all, stabilisers comprising metals, especially such as zinc, with a new generation of halogenated-polymer stabilisers.

The present invention lies more particularly in this field of research for novel stabilisers that will no longer require the combined use of stabilisers comprising metals (metallic stabilisers).

One subject of the present invention is thus the use for stabilising halogenated polymers, of a composition free of derivatives of 6-aminouracyl or 6-aminothiouracyl type, bearing substituents in positions 1 and 3, and comprising at least one β-diketone bearing two aromatic nuclei, at least one of which bears at least one substituent on one of the two orthopositions or on the paraposition; the said substituent being chosen from the radicals —R, —OR, —SR, —COOH, —O—CF$_3$ and —S—CF$_3$, in which formulae R is an alkyl radical.

The advantage of β-diketones of this type is that they more efficiently improve the coloration stability (long-term stability) and the initial coloration of the polymers containing them, compared with compositions comprising unsubstituted diaromatic β-diketones. This advantage is even more marked when the said β-diketones are used in the absence of metallic stabilisers.

It should be noted that the term "metallic stabilisers" more particularly means salts of saturated or unsaturated, aromatic or non-aromatic C$_1$–C$_{20}$ aliphatic carboxylic acids, optionally bearing one or more hydroxyl groups, or saturated or unsaturated, aromatic or non-aromatic aliphatic C$_1$–C$_{20}$ alkoxides, of an alkaline-earth metal or a metal chosen from column IIB of the Periodic Table of the Elements (published in the supplement to the Bulletin de la Société Chimique de France, No. 1, January 1966), alone or as mixtures. These metals are chosen more particularly from calcium and zinc or a combination thereof.

Moreover, as more specifically regards the compounds of aminouracyl type, the substituents in positions 1 and 3 are more particularly C$_1$–C$_{12}$ alkyl, C$_3$–C$_6$ alkenyl, C$_5$–C$_8$ cycloalkyl and C$_7$–C$_9$ alkylphenyl radicals; the said radicals being optionally substituted with 1 to 3 C$_1$–C$_4$ alkyl or alkoxy or C$_5$–C$_8$ cycloalkyl groups, a hydroxyl radical or a chlorine atom.

A second subject of the present invention consists of halogenated polymers stabilised with such a composition.

However, other characteristics and advantages of the present invention will emerge more clearly on reading the description and the examples that follow.

As has been mentioned above, one subject of the present invention is the use of a halogenated-polymer stabilising composition comprising at least one β-diketone bearing two aromatic nuclei, at least one of which bears at least one substituent on one of the two orthopositions or on the paraposition; the said substituent being chosen from —R, —OR, —SR, —COOH, —O—CF$_3$ and —S—CF$_3$ radicals, in which formulae R is an alkyl radical.

According to one more particular embodiment of the invention, the two aromatic nuclei of the β-diketone bear at least one substituent on one of the two orthopositions or on the paraposition; the said substituents being identical or different.

Preferably, the two aromatic nuclei of the β-diketone each bear a substituent in the paraposition.

The two substituents may be identical or different.

The aromatic nuclei of the β-diketone more particularly contain six carbon atoms.

According to one particularly advantageous embodiment of the present invention, the β-diketone is a substituted dibenzoylmethane derivative.

According to a first variant of the invention, the β-diketone substituent(s) is (are) chosen from alkyl radicals containing 1 to 10 carbon atoms. Examples of such radicals that may be mentioned include methyl, ethyl, propyl, isopropyl, butyl, isobutyl and tert-butyl radicals.

According to a second variant of the invention, the β-diketone substituent(s) is (are) chosen from radicals —OR or —SR containing 1 to 10 carbon atoms. The abovementioned alkyl radicals, linked to the aromatic nucleus via an oxygen or a sulphur, are suitable for use.

A third variant consists of substituents of the carboxylic type, this radical being linked to the aromatic nucleus via the carbonyl group.

A fourth variant consists of substituents chosen from the following radicals: —O—CF$_3$, —S—CF$_3$.

As mentioned previously, at least one of the two aromatic nuclei is substituted, and preferably both are substituted. In addition, they may each bear one or more identical or different substituents.

These compounds may be obtained by any means known to those skilled in the art.

However, one very advantageous method for preparing these β-diketones consists in reacting a ketone bearing an optionally substituted aromatic nucleus with an ester bearing an optionally substituted aromatic nucleus, depending on the nature of the desired β-diketone.

It should be noted that the ester is more particularly chosen such that the alcohol from which it is derived is volatile under the reaction conditions.

The reaction is moreover performed in the presence of an alkoxide, the alcohol of which is volatile under the operating conditions.

Furthermore, the ketone is added to the ester while at the same time gradually removing the alcohol as it is formed.

According to one characteristic of this process, the molar ratio of the ketone to the ester is between 2/3:1 and 1:1.

This process is described in European patent EP 596 809, to which reference will be made for further details in this respect.

More particularly, the composition according to the invention has a β-diketone content of between 0.005 and 5 g per 100 g of halogenated polymer. Preferably, the said content is between 0.1 and 5 g per 100 g of halogenated polymer.

The composition used according to the invention may moreover comprise additives that are conventional in the field.

However, it should be noted that, according to one particularly advantageous embodiment of the invention, the stabilising composition is free of metallic stabilisers in the sense indicated previously.

It may optionally comprise at least one additive chosen from polyols containing 2 to 32 carbon atoms and 2 to 9 hydroxyl groups.

Among these compounds that may be mentioned are $C_3$–$C_{30}$ diols such as propylene glycol, butanediol, hexanediol, dodecanediol and neopentyl glycol, polyols such as trimethylolpropane, pentaerythritol, dipentaerythritol, tripentaerythritol, xylitol, mannitol, sorbitol and glycerol, and oligomeric mixtures of glycerol with a degree of polymerization of from 2 to 10.

Another family of polyols that may conveniently be used consists of optionally partially acetylated polyvinyl alcohols.

Similarly, it is possible to use, as stabilising additive, hydroxylated compounds comprising isocyanurate groups, alone or in combination with the abovementioned polyols, for instance tris(2-hydroxyethyl) isocyanurate.

If it is used, the amount of additive is more particularly between 0.05 and 5 g per 100 g of polymer. More particularly, it is less than 2 g per 100 g of halogenated polymer.

The composition may also be used in combination with at least one compound comprising one or more epoxide functions. These compounds are more particularly chosen from epoxidized polyglycerides, or epoxidized fatty acid esters, such as epoxidized linseed oil, epoxidized soybean oil or epoxidized fish oil.

The content of this type of additive, when it is used, is advantageously between 0.5 and 10 g per 100 g of halogenated polymer.

Compounds of the type such as organic phosphites, for instance trialkyl, aryl, triaryl, dialkylaryl or diarylalkyl phosphites, for which the term "alkyl" denotes hydrocarbon-based groups of $C_8$–$C_{22}$ monoalcohols or polyols, and the term "aryl" denotes aromatic groups of phenol or of phenol substituted with $C_6$–$C_{12}$ alkyl groups, may optionally be incorporated. It is likewise possible to use calcium phosphites, for instance compounds of the type $Ca(HPO_3).(H_2O)$, and also phosphite-hydroxy-aluminium-calcium complexes.

The content of additive of this type is usually between 0.1 and 2 g per 100 g of halogenated polymer, when it is used.

Among the conventional additives that may similarly be mentioned are aluminium and/or magnesium sulphates and/or carbonates, especially of the hydrotalcite type. They are more particularly compounds of the formula $Mg_{1-x}Al_x(OH)_2 A^{n-}_{x/n}.mH_2O$, in which x is between 0 exclusive and 0.5, $A^{n-}$ represents an anion with n ranging from 1 to 3, especially such as carbonate, and m is positive. It should be noted that products of this type which have undergone a surface treatment with an organic compound may be used. Similarly, it would not constitute a departure from the context of the present invention to use a zinc-doped product of the hydrotalcite type, which has optionally undergone a surface treatment with an organic compound. Among the products of this type that may be mentioned most particularly is Alcamizer® 4 (sold by the company Kyowa).

Essentially amorphous compounds of formula $(MgO)_y.Al_2O_3.(CO_2)_x.(H_2O)_z$, in which x, y and z satisfy the following inequations: $0 < x \leq 0.7$; $0 < y \leq 1.7$ and $z \geq 3$, may also be used. These compounds are described especially in patent application EP 509 864. Moreover, the compounds known as catoites of formula $Ca_3Al_2(OH)_{12}$ or $Ca_3Al_2(SiO)_4(OH)_{12}$, may be used.

It is likewise possible to use additives of the type such as crystalline, synthetic alkali metal aluminosilicates, with a water content of between 13% and 25% by weight, of composition $0.7–1M_2O.Al_2O_3.1.3–2.4SiO_2$, in which M represents an alkali metal especially such as sodium. Zeolites of NaA type, as described in patent U.S. Pat. No. 4,590,233, are especially suitable for use.

The content of compounds of this type generally ranges between 0.1 and 5 g per 100 g of halogenated polymer.

The compositions may also comprise titanium dioxide, preferably in rutile form, which has optionally undergone a surface treatment, preferably a mineral surface treatment.

Generally, the particle size of the titanium dioxide is between 0.1 and 0.5 μm.

Among the titanium dioxides that are suitable for use, mention may be made, inter alia, of the titanium dioxides Rhoditan® RL18 and Rhoditan® RL90 sold by Rhodia Chimie, and the titanium dioxides Kronos 2081® and 2220® sold by Kronos.

The formulations based on halogenated polymers may similarly comprise other white or coloured pigments. Among the coloured pigments that may especially be mentioned is cerium sulphide.

It is indicated that the amount of pigment introduced into the formulation varies within a wide range and depends especially on the colouring power of the pigment and on the desired final coloration. However, for example, the amount of pigment may range from 0.1 to 20 g per 100 g of halogenated polymer and preferably from 0.5 to 15 g relative to the same reference.

Other conventional additives may complete the formulation, depending on the application for which it is intended.

In general, the formulation may comprise phenolic antioxidants, UV stabilisers such as 2-hydroxybenzophenones, 2-hydroxybenzotriazoles or sterically hindered amines, usually known as Hals.

The content of this type of additive generally ranges between 0.05 and 3 g per 100 g of halogenated polymer.

If necessary, lubricants may also be used, which will facilitate the implementation, these lubricants being chosen especially from glyceryl monostearates or propylene glycol, fatty acids or esters thereof, montanate waxes, polyethylene waxes or oxidized derivatives thereof, paraffins, metal soaps, and functionalized polymethylsiloxanes, for instance γ-hydroxypropylenated oils.

The amount of lubricant introduced into the formulation based on halogenated polymer generally ranges between 0.05 and 2 g per 100 g of halogenated polymer.

Plasticizers chosen from alkyl phthalates may also be used. The compounds most generally used are chosen from bis(2-ethylhexyl) phthalate, linear $C_6$–$C_{12}$ diacid esters, trimellitates or phosphate esters.

The amount of plasticizer used in the formulations varies within a wide range, as a function of the desired rigid or flexible nature. As a guide, the content ranges from 0 to 100 g per 100 g of halogenated polymer.

As regards the halogenated polymers that may be stabilized with the composition comprising at least one substituted aromatic β-diketone, these polymers are more especially chlorinated polymers.

The invention is particularly suitable for stabilising formulations based on polyvinyl chloride (PVC).

The term "polyvinyl chloride" means compositions whose polymer is a vinyl chloride homopolymer. The homopolymer may be chemically modified, for example by chlorination.

Numerous vinyl chloride copolymers may also be stabilised using the composition according to the invention. They are in particular polymers obtained by copolymerization of vinyl chloride with monomers containing an ethylenically polymerizable bond, for instance vinyl acetate, vinylidene chloride; maleic or fumaric acid or esters thereof; olefins such as ethylene, propylene or hexene; acrylic or methacrylic esters; styrene; vinyl ethers such as vinyl dodecyl ether.

Usually, the copolymers contain at least 50% by weight of vinyl chloride units and preferably at least 80% by weight of such units.

PVC, alone or as a mixture with other polymers, is the chlorinated polymer most widely used in the stabilised formulations according to the invention.

In general, any type of polyvinyl chloride is suitable, irrespective of its method of preparation. Thus, the polymers obtained, for example, by performing bulk, suspension or emulsion processes may be stabilised using the composition according to the invention, irrespective of the intrinsic viscosity of the polymer.

The halogenated polymer comprising the stabilising composition may be formed by any means known to those skilled in the art.

The various constituents may thus be incorporated into the halogenated polymer, individually or after a mixture of several of these constituents has been prepared.

The standard methods of incorporation are entirely suitable for obtaining the PVC-based formulation.

Thus, and purely as a guide, this operation may be performed in a mixer equipped with a system of paddles and counter-paddles operating at high speed.

Generally, the mixing operation is performed at a temperature below 130° C.

Once the mixture is prepared, the composition is formed according to the usual methods in the field, for instance injection-moulding, extrusion-blow moulding, extrusion, calendering or spin-moulding.

The temperature at which the forming is performed generally ranges from 150 to 220° C.

Another subject of the invention also consists of halogenated polymers stabilised with a composition free of derivative of aminouracyl or 6-aminothiouracyl type, and comprising at least one β-diketone bearing two aromatic nuclei, at least one of which bears at least one substituent on one of the two orthopositions or on the paraposition; the said substituent being chosen from —R, —OR, —SR, —COOH, —O—$CF_3$ and —S—$CF_3$ radicals, in which formulae R is an alkyl radical.

It should be noted that the halogenated polymers advantageously do not comprise metallic stabiliser.

The indications that have been given regarding the nature and amount of β-diketone remain valid and will not be repeated here.

In addition, the halogenated polymer may comprise one or more additives that are conventional in the field, such as those described previously.

Reference may be made to the list of compounds mentioned in the description of the combination according to the invention, and also to the respective amounts thereof.

The examples that follow are intended to illustrate the invention without limiting it.

EXAMPLES

1/Composition of the Polymer Formulation

| | |
|---|---|
| PVC resin prepared by suspension polymerization and sold under the name S110P ® (Atochem) | 100 parts |
| Impact reinforcer - acrylic polymer Paraloid KM 355 ® (Rohm & Haas) | 6 parts |
| $CaCO_3$ Omyalit 95 T ® (Omya) | 5.0 parts |
| Lubricants: Loxiol G 60 ® (Henkel) | 0.4 part |
| Loxiol G 22 ® (Henkel) | 0.2 part |
| Processing aid Paraloid K120N ® (Rohm & Haas) | 1 part |
| Hydrotalcite Alcamizer 1 ® (Kyowa Chemical Industry) | 0.6 part |

2/Stabilisers Tested

| | |
|---|---|
| 4-t-butyl-4'-methoxydibenzoylmethane (sample 1) | 3 parts |
| 4,4'-dimethoxydibenzoylmethane (sample 2) | 3 parts |
| Dibenzoylmethane (comparative sample 3) | 3 parts |

3/Preparation of the Samples

The constituents of each sample are mixed together for 10 minutes using a Braun brand food processor.

The powders thus homogenized are calendered for 3 minutes at 180° C. on a roll mill. Sheets are obtained, from which are cut squares (7 cm×7 cm) that are pressed in pairs for 4 minutes in a mould heated to 180° C. Circular specimens 1.5 cm in diameter and 1 mm thick are then cut out.

4/Tests

The specimens are placed in a rotating-plate oven heated to 180° C.

They are removed at regular intervals to perform coloration measurements.

This makes it possible to obtain the thermal degradation of the specimen as a function of the residence time in the oven at 180° C.

The thermal degradation is quantified by monitoring, as a function of time, the change in the colour of the sample measured using a Minolta CR-300® calorimeter, and is expressed by its coordinates in the L*a*b* colour space (CIELAB).

| Time | Sample 1 | | | Sample 2 | | | Comparative sample 3 | | |
|---|---|---|---|---|---|---|---|---|---|
| Mins | L* | a* | b* | L* | a* | b* | L* | a* | b* |
| 0 | 68.6 | −0.11 | 35.3 | 71.0 | 3.40 | 27.1 | 71.3 | −2.47 | 28.0 |
| 10 | 64.9 | 6.60 | 39.6 | 69.3 | 0.40 | 32.8 | 48.6 | 13.8 | 16.8 |
| 20 | 63.0 | 9.33 | 40.1 | 68.3 | 0.50 | 34.4 | 39.0 | 10.7 | 11.6 |
| 30 | 61.1 | 12.0 | 38.7 | 67.0 | 2.03 | 37.0 | 37.6 | 5.97 | 10.4 |
| 40 | 56.2 | 15.6 | 36.9 | 64.8 | 5.18 | 35.5 | — | — | — |

-continued

| Time | Sample 1 | | | Sample 2 | | | Comparative sample 3 | | |
|---|---|---|---|---|---|---|---|---|---|
| Mins | L* | a* | b* | L* | a* | b* | L* | a* | b* |
| 50 | 34.1 | 9.34 | 10.1 | 54.4 | 14.2 | 30.8 | — | — | — |
| 60 | 31.1 | 7.13 | 9.39 | 31.1 | 9.36 | 7.68 | — | — | — |

The invention claimed is:

1. A process for stabilising halogenated polymers, comprising the steps of adding to said polymers a stabilizing amount of a composition free of 6-aminouracyl or 6-aminothiouracyl compounds bearing substituents in positions 1 and 3, and free of metallic stabilisers and comprising 4-t-butyl-4'-methoxydibenzoylmethane or 4,4'-dimethoxydibenzoylmethane.

2. The process according to claim 1, wherein the β-diketone is present in an amount of between 0.005 and 5 g per 100 of halogenated polymers.

3. The process according to claim 2, wherein said amount is of between 0.1 and 5 g per 100 g of halogenated polymers.

4. The process for stabilising halogenated polymers, comprising the steps of adding to said polymers a stabilizing amount of a composition free of 6-aminouracyl or 6-aminothiouracyl compounds bearing substituents in positions 1 and 3, and free of metallic stabilisers, and consisting essentially of:

4-t-butyl-4'-methoxydibenzoylmethane or 4,4'-dimethoxydibenzoylmethane.

* * * * *